United States Patent [19]
Parr

[11] 3,807,252
[45] Apr. 30, 1974

[54] ADJUSTABLE STEERING WHEEL ASSEMBLY FOR VEHICLES

[75] Inventor: Alta M. Parr, Peoria, Ill.

[73] Assignee: Caterpillar Tractor Co., Peoria, Ill.

[22] Filed: Aug. 14, 1972

[21] Appl. No.: 280,727

[52] U.S. Cl.................... 74/493, 74/495, 280/87 A
[51] Int. Cl................................................ B62d 1/18
[58] Field of Search................... 74/495, 493, 556; 280/87 A, 87 B

[56] References Cited
UNITED STATES PATENTS

| | | | |
|---|---|---|---|
| 3,395,930 | 8/1968 | Morgan | 74/493 |
| 3,555,924 | 1/1971 | Scheffler, Jr. | 74/493 |
| 3,199,625 | 8/1965 | Liebreich | 74/495 X |
| 3,718,053 | 2/1973 | Cinadr | 74/493 |

*Primary Examiner*—Benjamin W. Wyche
*Assistant Examiner*—F. D. Shoemaker
*Attorney, Agent, or Firm*—Fryer, Tjensvold, Phillips & Lempio

[57] ABSTRACT

A housing on which a vehicle steering column and steering wheel are mounted is supported on a fixed console adjacent the operator's compartment by a pivotable coupling thereto whereby the housing, column and steering wheel may be selectively tilted as a unit between a plurality of positions thereby providing for greater operator convenience. To hold the steering wheel assembly at a selected position in a positive manner while providing for an extremely quick and convenient release for adjustment to another position, a bracket is secured to the housing for pivoting motion therewith and has a plurality of notches in one edge. A push rod extends outward from the console and is spring biased to an outward position. The push rod has an angled inner end which engages a selected one of the notches on the bracket to hold the steering assembly in a selected position. Thus, the operator need only depress the push rod momentarily to release the assembly for the adjustment.

5 Claims, 3 Drawing Figures

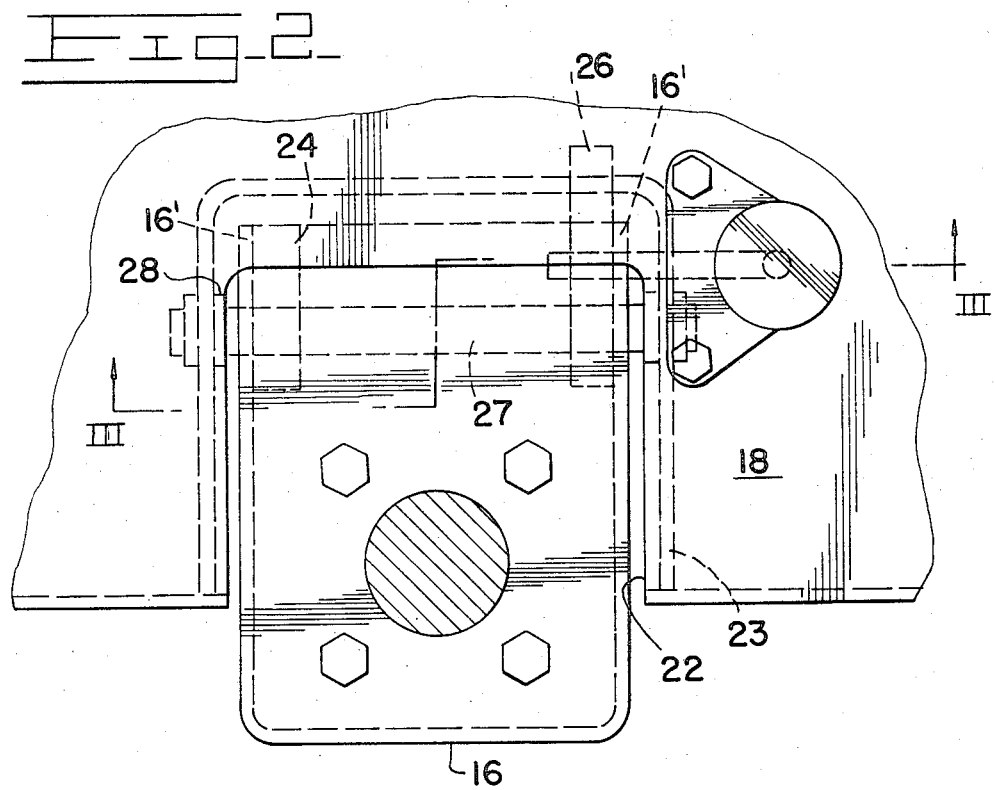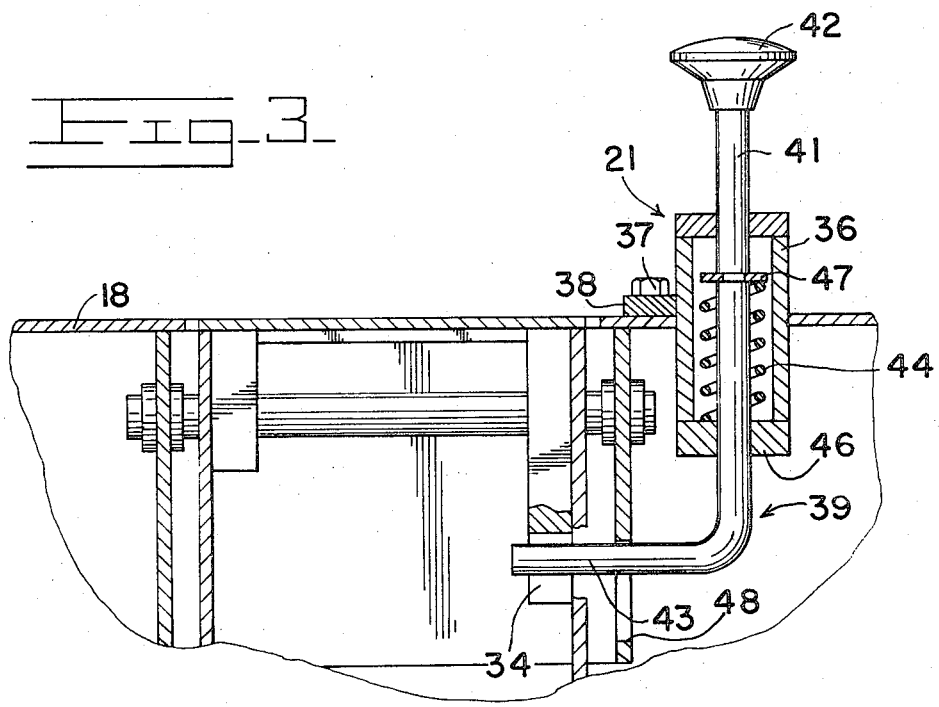

ADJUSTABLE STEERING WHEEL ASSEMBLY FOR VEHICLES

BACKGROUND OF THE INVENTION

This invention relates to steering mechanisms for vehicles and more particularly to means providing for selective tilting of a steering wheel between a plurality of positions.

In some forms of vehicle, notably those employed in earthmoving operations, the operator may desire to shift between a standing and sitting position while controlling the vehicle and this is greatly facilitated if the steering wheel may be tilted between at least two positions. In other instances, where the operator may remain seated throughout vehicle operation, such adjustability of the steering wheel may still be very desirable to accomodate to different operators of different physical size. Accordingly, vehicles are often provided with steering wheel assemblies which are selectively tiltable.

In most instances, this requires that the steering assembly include means holding the steering wheel at a selected position. As heretofore constructed such means have variously tended to be excessively complex and costly, prone to jamming and malfunction or have required undesirably complicated or physically awkward hand movement for the purpose of releasing and engaging the latching means. In many cases, these prior mechanisms restrict access to adjacent portions of the vehicle. A further very serious problem is that installation on preexisting fixed steering wheel assemblies may require extensive modifications if it is practical at all.

Many such prior mechanisms do not provide a positive locking action but rely instead on a clamping or wedging action, resulting from tightening of threaded elements or the like, wherein the resistence of the steering assembly to unwanted tilting is dependent on the force applied to the clamping means.

SUMMARY OF THE INVENTION

This invention is a very simple and economically manufactured tiltable steering wheel assembly having latch means which provides a strong positive locking action and which is releasable by a simple linear depression of a push button. The presence of the tilting and latching means does not obstruct access to other components of the vehicle to any sizable extent and the mechanism is very readily installable in many existing vehicles.

Accordingly, it is an object of this invention to facilitate the operation of vehicles and to increase operator comfort by providing a compact, simple and economical tiltable steering wheel assembly having a strong positive latching action. It is a further object of the invention to provide an adjustable steering wheel assembly of this kind which allows relatively easy access to other vehicle components and which may quickly and easily be installed on vehicles having fixed steering assemblies.

The invention, together with further objects and advantages thereof, will best be understood by references to the following description of a preferred embodiment taken in conjunction with the accompanying drawings.

BRIEF DESCRIPTION OF THE DRAWINGS

In the accompanying drawings:

FIG. 2 is a cross section view of the assembly of FIG. 1 taken along line II—II thereof, and FIG. 3 is an additional section view of a portion of the mechanism taken along staggered line III—III of FIG. 2.

DESCRIPTION OF A PREFERRED EMBODIMENT

Figure 1:
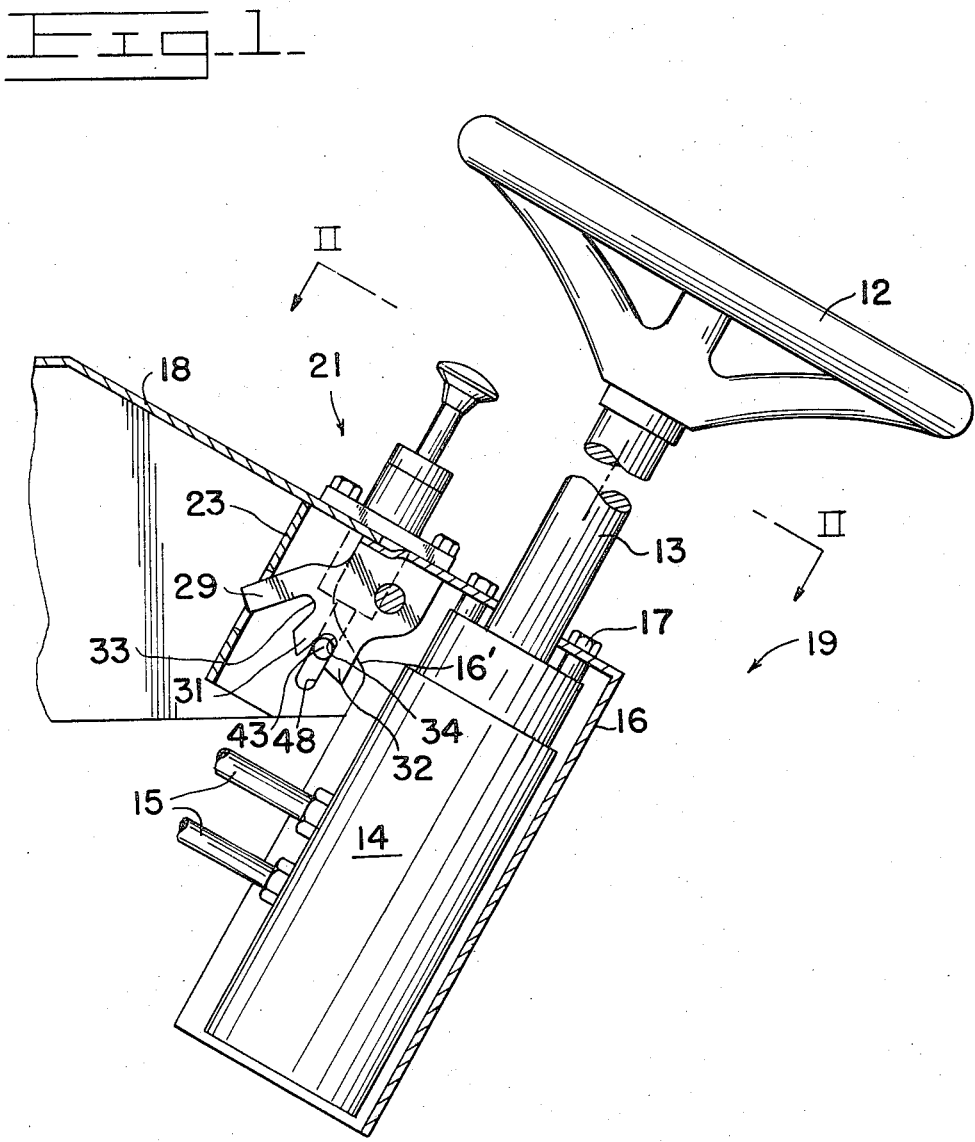
FIG. 1 is an elevation section view of a vehicle steering wheel assembly embodying the invention.

Referring now to the drawings and more particularly to FIG. 1 thereof, a vehicle steering wheel 12 is shown secured coaxially on the end of a short steering column 13 which extends from a cylindrical hydrostatic steering control 14. The hydrostatic steering control 14 may be of any suitable known construction wherein rotation of the steering column 13 in either direction generates fluid pressure signals in a pair of flexible output conduits 15, suitable detailed construction for such a unit and the steering system controlled thereby being well known to the art. Hydrostatic steering control 14 is secured within a rectangular housing 16 by bolts 17 which extend through the upper end of the housing. Thus the wheel 12, column 13 and housing 16 including steering control 14 jointly form a steering wheel assembly 19.

Vehicles of the type to which the invention is applicable have fixed support means, such as a console panel 18, situated in front of the operator's station. Console 18 faces the operator and is inclined in a forward direction. The steering wheel assembly 19 is pivoted to console 18 to support the assembly, while providing for selective raising and lowering of the steering wheel, and a latch mechanism 21 is provided to lock the assembly 19 at a selected position.

Referring now to FIGS. 1, 2 and 3 in conjunction, the upper end of housing 16 is received in a rectangular slot 22 formed in the lower edge of console 18. To provide for attachment of the housing 16 to console 18, a U-shaped frame 23 is secured to the underside of console 18 adjacent opening 22. Housing 16 has extensions 16' at the upper corners and a first bracket 24 is secured against one such extension while a second locking bracket 26 is secured against the other extension. To pivot the housing 16 to console 18, a pivot pin 27 is transpierced through both extensions 16', both brackets 24 and 26 and the two arms of frame 23 with suitable fastening means 28 being provided adjacent each end of the pivot pin to secure the pin in place.

Considering now the latch mechanism 21, one of the brackets, bracket 26 in this example, is provided with three integrally formed fingers 29, 31 and 32 extending from the forward edge of the bracket to define a pair of notches 33 and 34 in the bracket. The uppermost finger 29 is longest and the intermediate and lower fingers 31 and 32 respectively are progressively shorter. Additional fingers and notches may be provided if additional steering wheel positions are desired.

Latch mechanism 21 further includes a cylindrical spring housing 36 transpierced through console 18 and secured thereto by capscrews 37 which are transpierced through a flange 38 on the housing. A linear push rod 39 extends axially through spring housing 36 and has an outer end 41 extending outward from the housing and having a suitable knob 42 formed thereon to facilitate manual operation. Push rod 39 has an inner end 43 which is right angled relative to the outer end to extend substantially parallel to the console panel 18 and which may be received in a selected one of the notches 33 or 34 of locking bracket 26. Inner end 43 of push rod 39 is normally held in a selected one of the bracket notches 33 or 34 by a compression spring 44. Spring 44 is disposed within spring housing 36 in coaxial relation to the push rod and acts between an inner end member 46 of the spring housing and a flange 47 on the push rod. Spring 44 thus acts on the push rod in a direction tending to urge the push rod outward relative to console panel 18 and thereby acts to hold inner end 43 in engagement with the selected one of notches 33 and 34. Inner end 43 of the puse rod extends through a slot 48 in U-shaped member 23 which slot acts to hold the push rod against rotation relative to the axis of spring housing 33.

In operation, spring 44 normally holds inner end 43 of push rod 39 in a selected slot 32 or 34 and thereby acts to hold the steering wheel assembly 19 against undesired pivoting movement with a strong positive locking action. When a change of height and inclination of the steering wheel assembly 19 is desired, the operator need only depress knob 42 with a simple linear movement. Such action disengages inner end 43 of the push rod 39 from notch 32 or 34 enabling the steering wheel assembly to be shifted to the alternate position. Release of the push rod 39 then enables spring 44 to reengage end 43 of the push rod in the alternate one of the notches 32 and 33 again locking the steering assembly in position with a positive secured action.

The differing lengths of the fingers 29, 31 and 32 of locking bracket 26 facilitate locating of the assembly at positions corresponding to the two notches 32 and 33 in that contact of a particular finger with push rod end 43 can readily be sensed by touch through the steering wheel. The uppermost finger 29 is sufficiently long to abut inner end 43 of the push rod when the push rod is depressed to the maximum extent permitted by slot 48. Thus the assembly 19 cannot be tilted upwardly past the position at which rod end 43 enters notch 33. The assembly cannot be lowered past the position at which rod end 43 enters notch 34 owing to abutment of housing extensions 16' against the underside of panel 18 at that point.

While the invention has been described with respect to a single preferred embodiment it will be apparent that modifications are possible and it is not intended to limit the invention except as defined in the following claims.

What is claimed is:

1. An adjustable steering wheel assembly for a vehicle having a fixed console panel adjacent the operator's station thereof comprising:
a housing having steering mechanism disposed therein and having a steering column extending therefrom with a steering wheel being mounted on said column,
pivot means coupling said housing to said console panel and providing for pivoting movement of said housing relative to said console about a substantially horizontal axis,
a bracket secured to said housing for pivoting movement therewith and having a plurality of notches in one edge,
a push rod slidably mounted on said console panel and having an outer end extending outward therefrom and having an inner end on the opposite side of said panel from said operator's station, said inner end being angled relative to said outer end and positioned to engage any seleceted one of said notches when said push rod is urged outward from said panel and to disengage from said notches when said push rod is pushed toward said panel, and
resilient means urging said push rod outward from said panel,
wherein said console panel has a lower edge with a slot therein for receiving an upper end of said housing and wherein said bracket is secured to an upper corner of said housing adjacent said slot and wherein said pivot means comprises a pivot pin secured to said console panel and transpierced through said bracket.

2. An adjustable steering wheel assembly as defined in claim 1 wherein said push rod extends through a spring housing mounted on said console panel and wherein said resilient means comprises a spring disposed within said spring housing in coaxial relation to said outer end of said push rod to urge said push rod outward from said panel.

3. An adjustable steering wheel assembly as defined in claim 1 wherein said notches in said bracket are defined by spaced fingers formed at said edge thereof and wherein said fingers are of progressively greater length from the lowermost one of said fingers to the uppermost one thereof.

4. An adjustable steering wheel assembly as defined in claim 1 wherein said notches in said bracket are defined by spaced fingers formed at said edge thereof and wherein the uppermost of said fingers is proportioned to abut said inner end of said push rod when said push rod is pushed towards said panel to the maximum possible extent.

5. An adjustable steering wheel assembly for a vehicle having an inclined console panel facing the operator's position on said vehicle wherein said panel has an opening formed in a lower edge thereof, comprising:
a housing having an upper end fitting at least partially into said opening of said panel and supporting a hydrostatic steering means and a steering column extending from said housing with a steering wheel mounted thereon,
first and second bracket means secured to said housing below said panel adjacent said opening and at opposite sides of said opening, one of said bracket means having a plurality of spaced fingers extending downward and forward from an edge thereof to define a plurality of notches in said edge, said fingers being of progressively greater length from the lowermost to the uppermost thereof,
a spring housing secured to said panel,
a push rod extending through said spring housing and said panel and having an upper end extending outward from said spring housing and said panel and having means formed on said upper end for facilitating manual linear movement of said upper end toward said panel, said push rod having a lower end below said spring housing and said panel which is angled relative to said upper end to engage in a selected one of said notches of said one of said bracket means according to the inclination of said housing,
means holding said push rod against rotation about the axis of said outer end thereof,
spring means disposed in said spring housing and urging said push rod in an outward direction relative to said console panel, and
pivot means extending through said bracket means for pivotably coupling said housing to said console panel.

* * * * *